(12) United States Patent
Gelfenbeyn et al.

(10) Patent No.: US 10,503,470 B2
(45) Date of Patent: *Dec. 10, 2019

(54) METHOD FOR USER TRAINING OF INFORMATION DIALOGUE SYSTEM

(71) Applicant: Google LLC, Mountain View, CA (US)

(72) Inventors: Ilya Genadevich Gelfenbeyn, Linevo (RU); Olga Aleksandrovna Gelfenbeyn, Yurga (RU); Artem Goncharuk, Arlington, VA (US); Ilya Andreevich Platonov, Berdsk (RU); Pavel Aleksandrovich Sirotin, Moscow (RU)

(73) Assignee: GOOGLE LLC, Mountain View, CA (US)

( * ) Notice: Subject to any disclaimer, the term of this patent is extended or adjusted under 35 U.S.C. 154(b) by 63 days.

This patent is subject to a terminal disclaimer.

(21) Appl. No.: 15/951,455

(22) Filed: Apr. 12, 2018

(65) Prior Publication Data
US 2018/0232203 A1 Aug. 16, 2018

Related U.S. Application Data

(63) Continuation of application No. 14/721,044, filed on May 26, 2015, now Pat. No. 9,946,511, which is a (Continued)

(30) Foreign Application Priority Data

Nov. 28, 2012 (RU) .................................. 2012150997

(51) Int. Cl.
*G06F 3/16* (2006.01)
*G10L 15/18* (2013.01)
(Continued)

(52) U.S. Cl.
CPC ............ *G06F 3/167* (2013.01); *G10L 13/043* (2013.01); *G10L 15/063* (2013.01); *G10L 15/18* (2013.01);
(Continued)

(58) Field of Classification Search
None
See application file for complete search history.

(56) References Cited

U.S. PATENT DOCUMENTS 5,008,941 A   4/1991  Sejnoha
5,465,378 A   11/1995  Duensing
(Continued)

FOREIGN PATENT DOCUMENTS

WO   0250799   6/2002

OTHER PUBLICATIONS

Rukovodstvo polzovatelya interfeisa telefona Cisco Unity Connection (vypusk8. x). Cisco Systems, Inc., Feb. 2, 2010, p. 1, 3-4, 9-10.
(Continued)

*Primary Examiner* — Neeraj Sharma
(74) *Attorney, Agent, or Firm* — Middleton Reutlinger

(57) ABSTRACT

Provided is a method for user training of an information dialogue system. The method may include activating a user input subsystem, receiving a training request entered by the user, converting the training request into text by the user input subsystem, sending the text of the training request obtained as a result of the conversion to a dialogue module, processing the text of the training request by the dialogue module, forming a response to the training request by the dialogue module, and sending the response to the training request to the user. The response to the training request may be formed in a form of one or more of the following: a voice cue, a text, and an action performed by the information dialogue system.

20 Claims, 3 Drawing Sheets

Related U.S. Application Data continuation-in-part of application No. PCT/IB2012/056973, filed on Dec. 5, 2012.

(51) Int. Cl.
  *G10L 15/22* (2006.01)
  *G10L 13/04* (2013.01)
  *G10L 15/06* (2013.01)
  *G10L 15/26* (2006.01)

(52) U.S. Cl.
  CPC ............ *G10L 15/22* (2013.01); *G10L 15/265* (2013.01); *G10L 2015/0638* (2013.01); *G10L 2015/223* (2013.01)

(56) References Cited

U.S. PATENT DOCUMENTS

| | | | |
|---|---|---|---|
| 5,850,627 A * | 12/1998 | Gould | G09B 19/04 704/231 |
| 5,991,726 A | 11/1999 | Immarco et al. | |
| 6,088,669 A | 7/2000 | Maes | |
| 6,092,043 A | 7/2000 | Squires | |
| 6,181,778 B1 | 1/2001 | Ohki et al. | |
| 6,185,535 B1 | 2/2001 | Hedin et al. | |
| 6,415,257 B1 | 7/2002 | Junqua | |
| 6,493,661 B1 | 12/2002 | White, III et al. | |
| 6,606,598 B1 | 8/2003 | Holthouse et al. | |
| 6,757,362 B1 * | 6/2004 | Cooper | H04M 3/527 379/88.01 |
| 6,795,807 B1 | 9/2004 | Baraff | |
| 6,795,808 B1 | 9/2004 | Strubbe et al. | |
| 6,915,254 B1 | 7/2005 | Heinze et al. | |
| 6,963,841 B2 | 11/2005 | Handal et al. | |
| 7,110,963 B2 * | 9/2006 | Negreiro | G06K 17/00 704/275 |
| 7,216,080 B2 | 5/2007 | Tsiao et al. | |
| 7,346,490 B2 | 3/2008 | Fass et al. | |
| 7,442,107 B1 | 10/2008 | Ueda et al. | |
| 7,844,465 B2 * | 11/2010 | Marcus | G10L 15/08 704/231 |
| 7,890,329 B2 | 2/2011 | Wu et al. | |
| 7,912,720 B1 | 3/2011 | Hakkani-Tur et al. | |
| 8,032,372 B1 | 10/2011 | Zimmerman et al. | |
| 8,521,766 B1 | 8/2013 | Hoarty | |
| 8,589,160 B2 | 11/2013 | Weeks et al. | |
| 8,738,377 B2 | 5/2014 | Byrne et al. | |
| 8,751,217 B2 * | 6/2014 | Ballinger | G10L 15/30 704/8 |
| 8,990,235 B2 | 3/2015 | King et al. | |
| 10,186,262 B2 | 1/2019 | Klein et al. | |
| 2002/0116174 A1 | 8/2002 | Lee et al. | |
| 2002/0128821 A1 | 9/2002 | Ehsani et al. | |
| 2002/0198714 A1 | 12/2002 | Zhou | |
| 2003/0008633 A1 * | 1/2003 | Bartosik | G06Q 10/10 455/406 |
| 2004/0030556 A1 | 2/2004 | Bennett | |
| 2004/0236581 A1 | 11/2004 | Ju et al. | |
| 2004/0249510 A1 | 12/2004 | Hanson | |
| 2004/0249628 A1 | 12/2004 | Chelba et al. | |
| 2005/0182625 A1 | 8/2005 | Azara et al. | |
| 2005/0203747 A1 | 9/2005 | Lecoeuche | |
| 2006/0031853 A1 | 2/2006 | Kuperstein | |
| 2006/0074656 A1 | 4/2006 | Mathias et al. | |
| 2006/0100875 A1 | 5/2006 | Schmidt et al. | |
| 2006/0122834 A1 | 6/2006 | Bennett | |
| 2006/0235690 A1 | 10/2006 | Tomasic et al. | |
| 2007/0033026 A1 | 2/2007 | Bartosik et al. | |
| 2007/0055520 A1 | 3/2007 | Mowatt et al. | |
| 2007/0083375 A1 | 4/2007 | Lee et al. | |
| 2007/0129946 A1 * | 6/2007 | Ma | G10L 13/027 704/256 |
| 2007/0192095 A1 | 8/2007 | Braho et al. | |
| 2007/0192101 A1 | 8/2007 | Braho et al. | |
| 2007/0208569 A1 | 9/2007 | Subramanian et al. | |
| 2007/0260461 A1 | 11/2007 | Marple et al. | |
| 2007/0263805 A1 | 11/2007 | McDonald | |
| 2007/0288242 A1 | 12/2007 | Spengler et al. | |
| 2007/0288268 A1 | 12/2007 | Weeks | |
| 2007/0294076 A1 * | 12/2007 | Shore | G06F 17/2836 704/2 |
| 2008/0010069 A1 | 1/2008 | Katariya | |
| 2008/0010071 A1 | 1/2008 | Callahan et al. | |
| 2008/0040111 A1 | 2/2008 | Miyamoto et al. | |
| 2008/0059173 A1 * | 3/2008 | Gilbert | G10L 15/265 704/235 |
| 2008/0077406 A1 | 3/2008 | Ganong, III | |
| 2008/0091406 A1 | 4/2008 | Baldwin et al. | |
| 2008/0126089 A1 | 5/2008 | Printz et al. | |
| 2008/0195391 A1 | 8/2008 | Marple et al. | |
| 2008/0254419 A1 | 10/2008 | Cohen | |
| 2008/0255835 A1 | 10/2008 | Ollason et al. | |
| 2008/0312928 A1 | 12/2008 | Goebel et al. | |
| 2009/0024411 A1 | 1/2009 | Albro et al. | |
| 2009/0098981 A1 * | 4/2009 | Del Giorno | G06F 19/3481 482/9 |
| 2009/0112596 A1 | 4/2009 | Syrdal et al. | |
| 2009/0150153 A1 | 6/2009 | Li et al. | |
| 2009/0150341 A1 | 6/2009 | Paek | |
| 2009/0187410 A1 | 7/2009 | Wilpon et al. | |
| 2009/0240488 A1 | 9/2009 | White et al. | |
| 2009/0259472 A1 | 10/2009 | Schroeter | |
| 2009/0265163 A1 | 10/2009 | Li et al. | |
| 2010/0042410 A1 | 2/2010 | Stephens, Jr. | |
| 2010/0057463 A1 | 3/2010 | Weng et al. | |
| 2010/0063823 A1 | 3/2010 | Wu et al. | |
| 2010/0121638 A1 | 5/2010 | Pinson et al. | |
| 2011/0119053 A1 | 5/2011 | Kuo et al. | |
| 2011/0131048 A1 | 6/2011 | Williams et al. | |
| 2011/0145224 A1 | 6/2011 | Bangalore | |
| 2011/0166852 A1 | 7/2011 | Kim et al. | |
| 2011/0184736 A1 | 7/2011 | Slotznick | |
| 2011/0301940 A1 * | 12/2011 | Hon-Anderson | G10L 15/063 704/9 |
| 2011/0301943 A1 | 12/2011 | Patch | |
| 2012/0022872 A1 | 1/2012 | Gruber et al. | |
| 2012/0041903 A1 | 2/2012 | Beilby et al. | |
| 2012/0089392 A1 | 4/2012 | Larco et al. | |
| 2012/0189177 A1 | 7/2012 | Oh | |
| 2012/0214447 A1 | 8/2012 | Russell et al. | |
| 2012/0253801 A1 | 10/2012 | Santos-Lang et al. | |
| 2012/0290509 A1 | 11/2012 | Heck et al. | |
| 2012/0316882 A1 | 12/2012 | Fiumi | |
| 2012/0323948 A1 | 12/2012 | Li et al. | |
| 2013/0046537 A1 * | 2/2013 | Weeks | G10L 15/26 704/235 |
| 2013/0185078 A1 | 7/2013 | Tzirkel-Hancock et al. | |
| 2013/0238312 A1 | 9/2013 | Waibel | |
| 2013/0268260 A1 | 10/2013 | Lundberg et al. | |
| 2013/0275875 A1 | 10/2013 | Gruber et al. | |
| 2013/0275899 A1 | 10/2013 | Schubert et al. | |
| 2014/0012586 A1 | 1/2014 | Rubin et al. | |
| 2014/0028780 A1 | 1/2014 | Croen et al. | |
| 2014/0149104 A1 | 1/2014 | Kim et al. | |
| 2014/0122083 A1 | 5/2014 | Xiaojiang | |
| 2014/0122407 A1 | 5/2014 | Duan | |
| 2014/0122618 A1 | 5/2014 | Duan | |
| 2014/0122619 A1 | 5/2014 | Duan | |
| 2014/0335497 A1 | 11/2014 | Gal et al. | |
| 2014/0365407 A1 | 12/2014 | Brown et al. | |
| 2015/0066479 A1 | 3/2015 | Pasupalak et al. | |

OTHER PUBLICATIONS

Podrobnosti o golosovom upravlenii v Windows Phone 8, Jun. 25, 2012 [on-line] [retrieved on Jul. 15, 2013]. Found from Internet:<URL: http://w7phone.ru/podrobnosti-o-golosovom-upravlenii-v-windows-phone-8-65- 033/>, p. 2.

Ispolzovanie golosovogo upravleniya. Copyright.COPYRGT. 1995-2010Opera Software ASA, [on-line] [retrieved on Jul. 15, 2013]. Found from Internet: <URL: http://help.opera.com/Windows/10.50/ru/voiceprefs.html>.

(56) References Cited

OTHER PUBLICATIONS

Nastroikagolosovykh komand. Copyright.COPYRGT. 1995-2010 OperaSoftware ASA, [on-line] [retrieved on Jul. 15, 2013]. Found from Internet: <URL:http://help.opera.com/Windows/10.60/ru/voiceprefs.html>.

A V. Frolov et al. Sintez i raspoznavanie rechi. Sovremennye resheniya, Oct. 14, 2012 [on-line] [retrieved on Jul. 15, 2013]. Foundfrom Internet: <URL: http://web.archive.org/web/20121014093936/www.frolov-lib.ru/book- s/hi/ch06.html>p. 2, par. "Sistema raspoznovaniya I obrabotki rechi", p. 3, par. "Programma VoiceNavigator", p. 16-18, par. "Dopolnitelnoe obuchenie proiznosheniju slov", p. 31-33, par. "Komandy", "Vvod simvolov".

* cited by examiner

METHOD FOR USER TRAINING OF INFORMATION DIALOGUE SYSTEM

TECHNICAL FIELD

This application relates to information technologies and, in particular, to a method for user training of an information dialogue system based on a natural language.

BACKGROUND

Information dialogue systems gained widespread use and are used in various fields of social life, such as, for example, organizing automatic knowledge tests, an automated customer support service, disease diagnostics, and so forth. However, existing information dialogue systems are aimed at solving narrow profile tasks; therefore, they can only support a dialogue on a given topic. In addition, most existing information dialogue systems are not able to form a response in a natural language, or impart emotional overtone to a generated response, or to interact with other information systems and subsystems. The essential disadvantage is the fact that an end user who interacts with such systems has no possibility to train existing information dialogue systems. Most often the user interacts with the information dialogue systems which contain preliminarily filled knowledge databases, without having the possibility to customize the information dialogue system according to his own preferences.

The above-mentioned abilities can allow for performing two-way exchange of information, instructions, and commands between the user and the information dialogue system, and conducting a meaningful dialogue, thereby creating for the user the impression of communicating with a living interlocutor. Furthermore, much more effective problem solving may be provided.

Conventional adaptive natural language interfaces and methods for receiving, interpretation, and execution of a user input in a natural language are described, e.g., in U.S. Pat. No. 7,216,080, published on March, 2007. The method includes entering a request by the user, receiving and converting the request of the user into text, processing of the text and forming of a response in a form of an output command, converting the output command to an execution command, and outputting the execution command to an additional system and/or subsystems for execution. The method provides the possibility for user communication with the information dialogue system in the natural language. However, the method does not assume user training of the information dialogue system or customizing of the information dialogue system by the user, thereby significantly limiting a scope of tasks which can be solved using the method. The disadvantages of the described solution may further include the possibility for the user to enter requests only in the natural language. At the same time, the user has no possibility to enter the request using a keyboard, as may be necessary.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

Provided are an information dialogue system and a method of user training of the information dialogue system. The method for user training of the information dialogue system may include activating a user input subsystem, receiving a training request entered by the user, converting the training request into text by the user input subsystem, sending the text of the training request obtained as a result of the conversion to a dialogue module, processing the text of the training request by the dialogue module, forming a response to the training request by the dialogue module, and sending the response to the training request to the user. The response to the training request may be formed in a form of one or more of the following: a voice cue, a text, and an action performed by the information dialogue system.

According to an example embodiment, the information dialogue system may include a user input subsystem, a voice generation and reproduction subsystem, a display and a keyboard of a user device, additional buttons, a dialogue module, additional systems and/or subsystems, a user profile, and a client memory. The user input subsystem may include at least two components, by means of which the user input may be received and converted. These components may include a voice record and recognition component, a keyboard, and like devices, components, and means accompanied by appropriate software, if necessary.

In further exemplary embodiments, modules, subsystems, or devices can be adapted to perform the recited steps. Other features and exemplary embodiments are described below.

BRIEF DESCRIPTION OF THE DRAWINGS

Embodiments are illustrated by way of example and not limitation in the figures of the accompanying drawings, in which like references indicate similar elements.

DETAILED DESCRIPTION

The following detailed description includes references to the accompanying drawings, which form a part of the detailed description. The drawings show illustrations in accordance with exemplary embodiments. These exemplary embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is, therefore, not to be taken in a limiting sense, and the scope is defined by the appended claims and their equivalents.

The present disclosure relates to methods for user training of an information dialogue system. A method for user training of an information dialogue system may provide the possibility to expand the possibilities of user interaction with the information dialogue system, customize the information dialogue system according to preferences of the user, and be convenient in implementation for the user.

More specifically, the information dialogue system in the context of the present disclosure is a system equipped with a user input subsystem, a voice generation and recognition subsystem, a display and a keyboard of a user device, additional buttons, a dialogue module, additional systems and/or subsystems, a user profile, a client memory, and so forth. The user input subsystem may be a subsystem that includes at least two components, by means of which the user input may be received and converted. The components may include a voice recording and recognition component, a keyboard, and like devices, components, and means accompanied by appropriate software, if necessary.

The method for user training of the information dialogue system may include activating a user input subsystem, followed by entering of a training request by a user. The user input subsystem may receive and convert the training request of the user into the text and send the text of the training request obtained as a result of the conversion to a dialogue module. The dialogue module may process the text of the training request and form the response to the training request. The dialogue module may further send the response to the training request to the user. The response to the training request may be formed as a voice cue and/or response text, and/or an action being performed by the information dialogue system.

Figure 1:
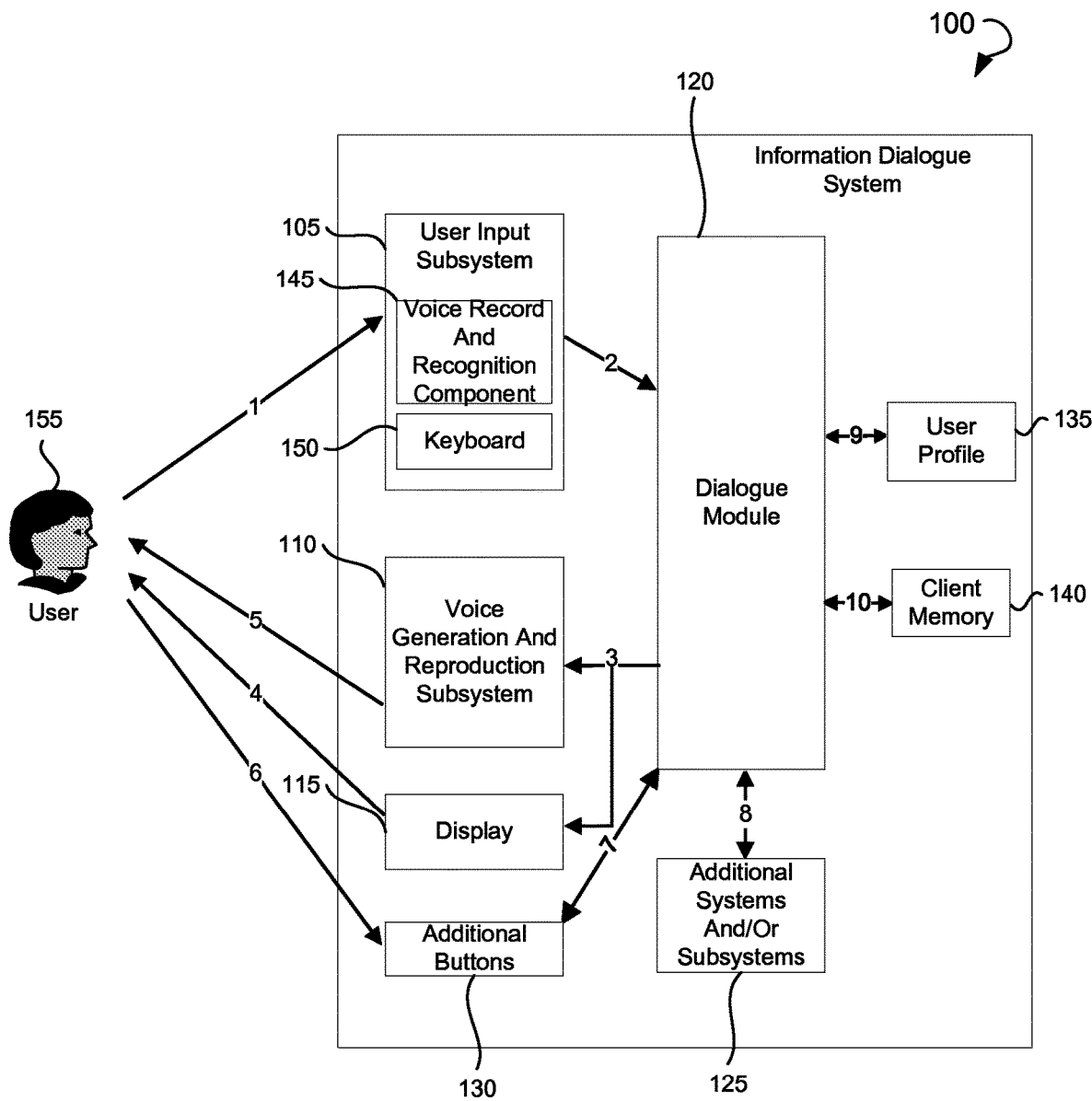
FIG. 1 shows a detailed block diagram of an information dialogue system, in accordance with certain embodiments.

Referring now to the drawings, FIG. 1 shows an information dialogue system 100. The information dialogue system 100 may include a user input subsystem 105, a voice generation and reproduction subsystem 110, a display 115, a dialogue module 120, additional systems and/or subsystems 125, additional buttons 130, a user profile 135, and a client memory 140. The user input subsystem may include a voice record and recognition component 145 and a keyboard 150.

In an example embodiment, the keyboard 150 and the display 115 may be associated with a user device (not shown). The user device may include mobile devices, such as a laptop, a netbook, a tablet, mobile phones, smartphones, and similar devices, as well as stationary electronic devices, such as computers and similar devices.

The additional buttons 130 may include physical buttons of the user device and soft keys of the information dialogue system 100. For example, pressing of the "Microphone" soft key by the user may activate or disable a voice record and recognition component 145, pressing of the "Cancel" soft key may cancel the current operation performed by the information dialogue system 100, and so forth. The additional systems and/or subsystems 125 in the context of the present disclosure may include systems for working with functions of the user devices, such as a global positioning system.

The user profile 135 may include an account that contains settings, preferences, instructions, and user information. The client memory 140 may store information about a user 155 that interacts with the information dialogue system 100.

FIG. 1 further shows interactions between the components of the information dialogue system 100, represented by arrows 1-10, namely:

1—activation of a user input subsystem 105 based on a user request; entering of a training request by the user 155; and receiving and converting the training request of the user 155 into the text by the user input subsystem 105;

2—sending of the text of the training request received as a result of conversion to a dialogue module 120, followed by processing of the received text by the dialogue module 120 and forming of a response to the training request by the dialogue module 120;

3—sending of the response to the training request to the user 155;

4—displaying of the response to the training request in the form of the text on a display 115;

5—reproduction of the response to the training request in the form of a voice cue by a voice generation and reproduction subsystem 110, followed by an automatic activation of the user input subsystem 105;

6—pressing of additional buttons 130 by the user 155 (for example, disabling the voice record and recognition component 145);

7—performing of the actions corresponding to the additional buttons 130;

8—interaction with additional systems and/or subsystems 125 (sending of the request to the additional systems and/or the subsystem 125 by the dialogue module 120, processing of the received request by the additional systems and/or the subsystems 125, sending of a result to the dialogue module 120);

9—interaction with a user profile 135 (sending of the request by the dialogue module 120, receiving information from the user profile 135);

10—interaction with a client memory 140.

The interactions marked by arrows 4, 5, 6, 7, 8, 9, and 10 may be optional.

Figure 2:
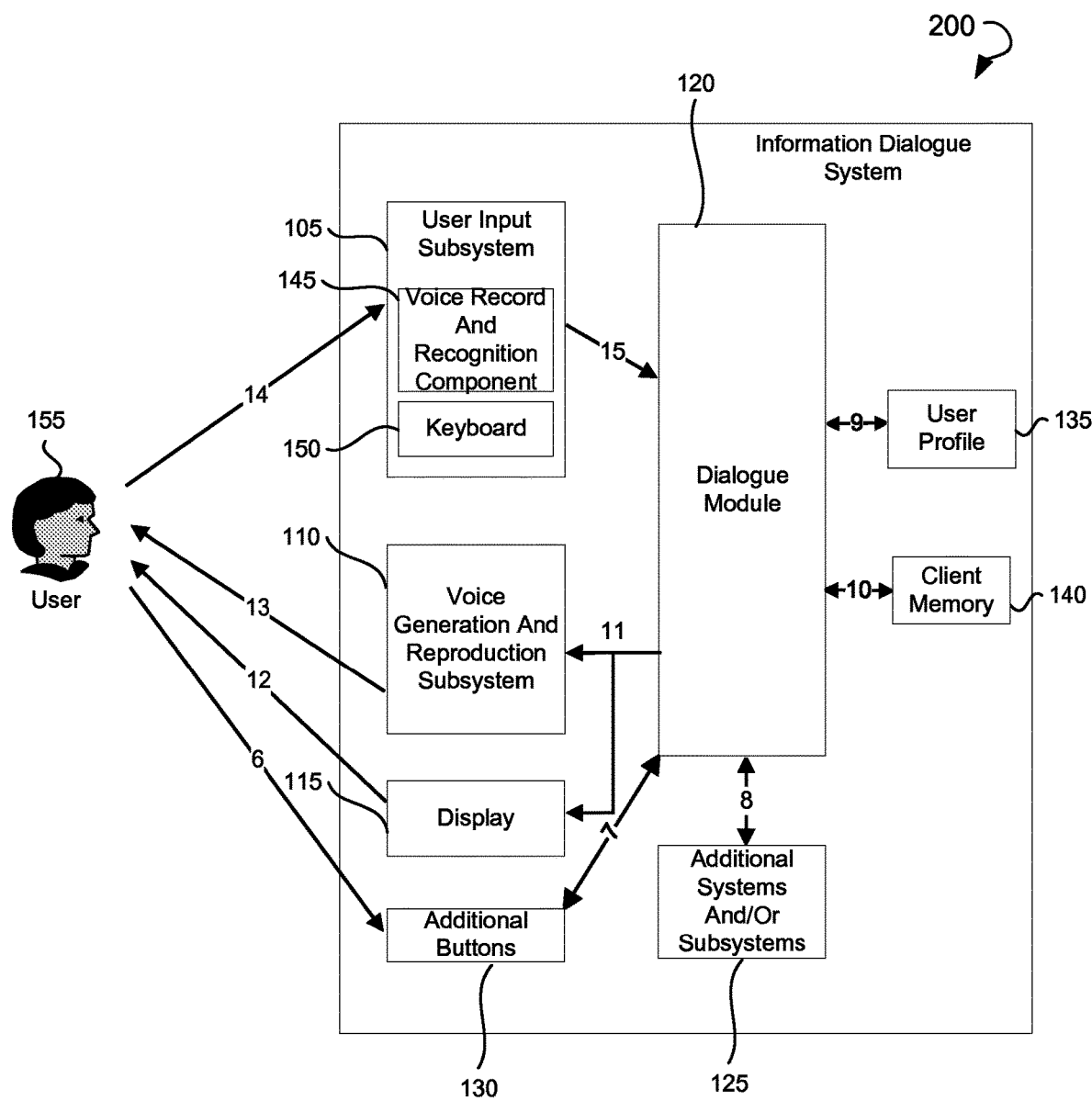
FIG. 2 shows a detailed block diagram of interactions between the components of an information dialogue system, in accordance with certain embodiments.

FIG. 2 is a diagram 200 showing interactions between the components of the information dialogue system 100 performed after processing of the text of the training request and before forming of the response to the training request by the dialogue module 120. The interactions between the components of the information dialogue system 100 are represented by arrows 11-15, namely:

11—forming of a clarification request or a confirmation request and sending of the clarification request or the confirmation request to the user 155 by the dialogue module 120;

12—displaying of the clarification request or the confirmation request in the form of the text on the display 115;

13—reproduction of the clarification request or the confirmation request in the form of the voice cue by the voice generation and reproduction subsystem 110, followed by the automatic activation of the user input subsystem 105;

14—entering of a response to the clarification request or the confirmation request by the user 155; receiving the response to the clarification request or the confirmation request; and converting the response to the clarification request or the confirmation request into the text by the user input subsystem 105;

15—sending of the text of the response to the clarification request or the confirmation request received as a result of conversion to the dialogue module 120, followed by processing of the text of the response to the clarification request or the confirmation request by the dialogue module 120.

Figure 3:
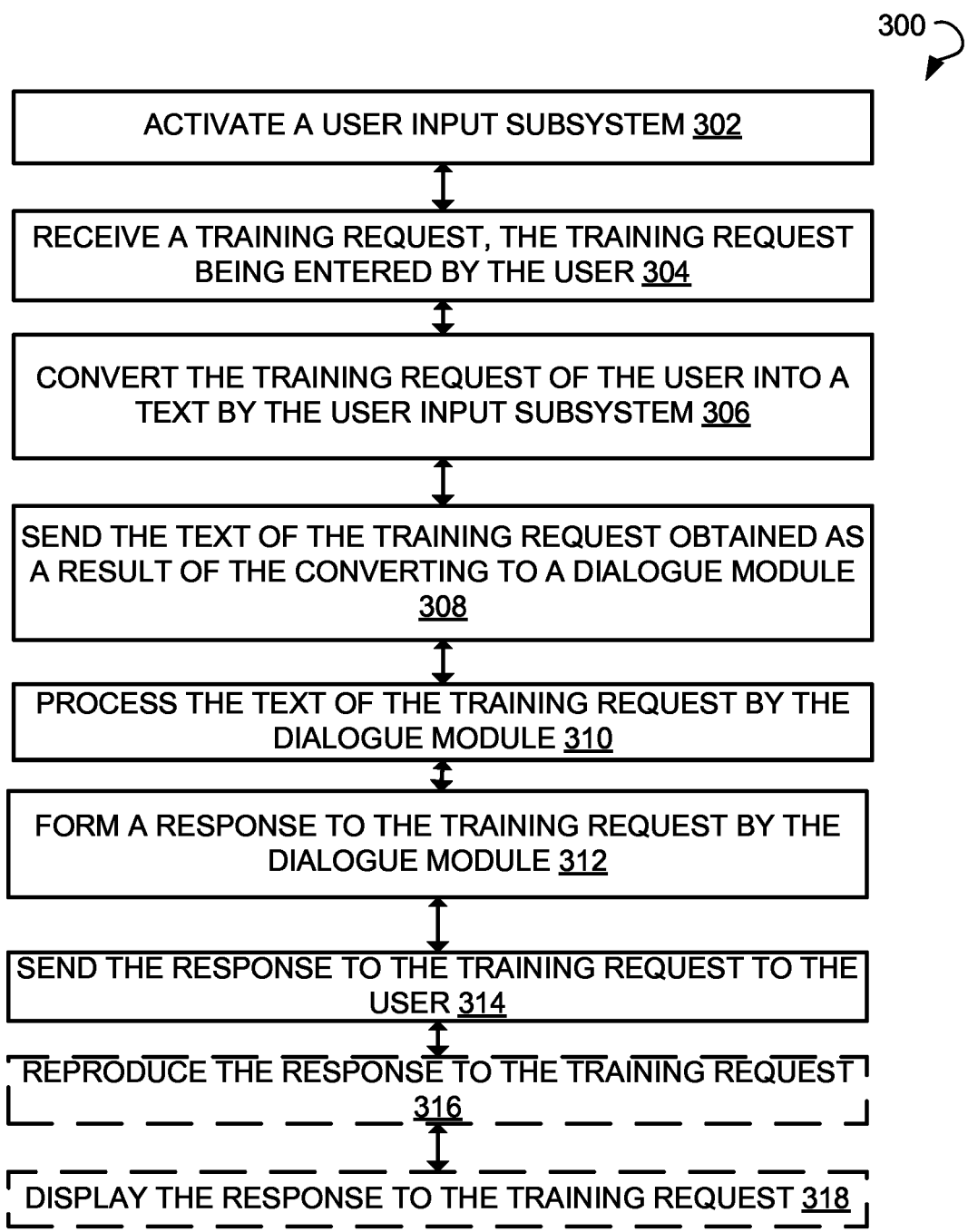
FIG. 3 illustrates a flowchart of a method for user training of an information dialogue system, in accordance with certain embodiments.

FIG. 3 shows a flowchart of a method 300 for user training of an information dialogue system including necessary and optional operations of the method 300. The method 300 may start with activating a user input subsystem at operation 302. In an example embodiment, the user input subsystem is activated by a user using a user device. More specifically, the user input subsystem may be activated based on an activation request sent by the user using the user device.

The method 300 may continue with receiving a training request by the user input subsystem at operation 304. The training request may be entered by the user. In an example embodiment, the training request may serve as the activation request. In an example embodiment, the training request may be entered using one or more of the following: a voice command and a keyboard of the user device. The training request of the user may include the voice command generated by the user or text that the user inputs using the keyboard. Thus, the user may have the possibility to enter the training request not only by voice command, but also by means of the keyboard of the user device.

At operation 306, the user input subsystem may convert the training request of the user into a text. The method 300 may further include sending the text of the training request obtained as a result of the converting to a dialogue module at operation 308.

At operation 310, the dialogue module may process the text of the training request. The method 300 may further include forming a response to the training request by the dialogue module at operation 312. The response to the training request may be formed as one or more of the following: a voice cue, a response text, and an action performed by the user input subsystem.

At operation 314, the response to the training request may be sent to the user. In an example embodiment, after sending of the response to the training request, the method 300 may further include providing the response to the training request. In particular, the providing of the response to the training request may include reproducing the response to the training request at operation 316. In an example embodiment, the response to the training request may be reproduced as the voice cue. The reproducing of the response to the training request may be performed by a voice generation and recognition subsystem. Furthermore, the providing of the response to the training request may include displaying the response to the training request at operation 318. More specifically, the response text may be displayed on the display of the user device. Thereby, the user can be notified that the training request was accepted.

Furthermore, upon providing of the response to the training request, the method 300 may continue with forming recommendations on editing of training requests. The method 300 may further include displaying and reproducing of the recommendations on editing of the training requests. Thus, the user may have no need to look for the additional information. Thereby, the convenience of training of the information dialogue system for the user can be provided.

In an example embodiment, after the processing of the text of the training request by the dialogue module and before the forming of the response to the training request by the dialogue module, the method 300 may include forming a clarification request or a confirmation request by the dialogue module. The clarification request or the confirmation request may be sent to the user.

The method 300 may further include providing of the clarification request or the confirmation request to the user. In an example embodiment, the providing of the clarification request or the confirmation request may include one or more of the following: displaying the clarification request or the confirmation request and reproducing the clarification request or the confirmation request. More specifically, the clarification request or the confirmation request may be displayed as a text on the display of the user device. Additionally, the clarification request or the confirmation request may be reproduced in a form of the voice cue by the voice generation and recognition subsystem.

Upon providing of the clarification request or the confirmation request, the method 300 may continue with receiving a response to the clarification request or the confirmation request. The response to the clarification request or the confirmation request may be entered by the user using, e.g., the user device. In an example embodiment, the response to the clarification request or the confirmation request may be entered by one or more of the following: the voice command and the keyboard of the user device. Thus, the user may have the possibility to perform entering of the response to the clarification request or confirmation request not only by the voice command, but also by means of the keyboard of the user device.

The method 300 may continue with converting of the response to the clarification request or the confirmation request into the text by the user input subsystem. The text of the response to the clarification request or the confirmation request obtained as a result of the converting may be sent to the dialogue module. The dialogue module may process the text of the response to the clarification request or the confirmation request.

Thus, the probability of a mistake occurring during training of the information dialogue system can be minimized. Besides, the user may be given the possibility to perform training of the information dialogue system in the most natural way, as during the real-life communication.

Upon receipt of the training request and the response to the clarification request or the confirmation request, a confirmation response may be provided. More specifically, the confirmation response may be formed, displayed, and reproduced. In an example embodiment, the confirmation response may be provided using one or more of the following: displaying the confirmation response on the display and reproducing the confirmation response as the voice cue. Thus, confirmation that the training request and the response to the clarification request or the confirmation request were accepted by the information dialogue system may be performed.

In an example embodiment, the response to the training request and the clarification request or the confirmation request may include additional metadata. The additional metadata may include instructions forwarded to additional systems and subsystems. The additional metadata may be an addition to the response to the training request, the clarification request, or the confirmation request formed by the dialogue module. The additional metadata may contain information on an emotional overtone of the response to the training request, the clarification request, or the confirmation request formed by the information dialogue system, which can be displayed on the display and reproduced by the voice generation and reproduction subsystem. Furthermore, additional metadata may contain instructions being sent to the additional systems and/or subsystems. Thus, the presence of any emotional overtone in the response to the training request, the clarification request, or the confirmation request may make for the user an impression of communication with the living interlocutor. Thereby, the convenience of the user's interaction with the information dialogue system may be increased. Also, the additional metadata may further contain extensions of the response to the training request, the clarification request, or the confirmation request specific to implementation of a specific dialogue subsystem.

In an example embodiment, the training request of the user may include commands for setting personalized responses to a question specified in the training request, commands for performance of an action or sequence of actions of the information dialogue system on the training request, and so forth. Also, by using the training request, a user request synonym may be established for simplification of the further input of the training request. An expression, phrase, action, or sequence of actions may be replaced by a single word, which can be subsequently processed by the information dialogue system as the command for execution. Thus, not only a convenience of further interaction with the information dialogue system can be provided, but also the high probability that the information dialogue system will understand requests entered by the user. The texts of the request mentioned further in examples of implementation of the method 300 are not the only possible examples. A single training request of the user may correspond to several responses of the information dialogue system.

The context of the present disclosure includes the possibility of configuring a set of actions as the response to the training request. The set of actions may be set by the user. Thus, a single training request of the user may be considered as a sequence of the training requests or actions of the information dialogue system.

If the training request conflicts with the preliminarily settings of the information dialogue system, either selecting a separate class of settings that cannot be changed is performed, or these settings are changed according to the training request, whereas the settings are considered as personalized or altered settings. Thus, the possibility of the user training of the information dialogue system and setting of the response to the phrase selected in the training request can be provided.

The method 300 may be performed cyclically, and the cycle of implementation of the method 300 may be finished on the initiative of the user. Thus, the training dialogue of the user with the information dialogue system can be implemented. Therefore, every time after receiving the response, the user may enter a new training request, and the information dialogue system can form a new clarification request or new confirmation request.

Examples of implementation of the method 300 for user training of the information dialogue system are described below with reference for FIG. 1 and FIG. 2.

A) Setting, by the User, of an Option of the Response for a Phrase Selected in the Training Request The user may activate the user input subsystem and enter the training request (arrow 1 on FIG. 1) (e.g., of the following content "Set a response to a question 'How are you doing?'"). The training request of the user may be further received and converted into the text by the user input subsystem. After that, the text of the training request obtained as a result of the conversion of the training request can be sent to the dialogue module. The received text may be processed by the dialogue module. The dialogue module may further form the response to the training request (arrow 2 on FIG. 1), form a clarification request, and send the clarification request to the user before forming of the response (arrow 11 on FIG. 2). For example, the clarification request may have the following content: "What response is to be given to your request?". Then, displaying of the clarification request in the form of the text on the display may be performed (arrow 12 on FIG. 2). Additionally, reproduction of the clarification request in the form of the voice cue by the voice generation and reproduction subsystem may be performed. Upon displaying and reproducing of the clarification request, the user input subsystem may be automatically activated (arrow 13 on FIG. 2). Then, the user may input a response to the clarification request. The response to the clarification request may be received and converted into the text by the user input subsystem (arrow 14 on FIG. 2). The response to the clarification request of the user may have the following content: "Great. Thank you for asking. And how are you?". Then, the text of the response to the clarification request obtained as a result of the conversion may be sent to the dialogue module, followed by processing of the text of the response to the clarification request by the dialogue module (arrow 15 on FIG. 2). Thereafter, the response to the training request may be formed by the dialogue module, and the response to the training request may be sent to the user (arrow 3 on FIG. 1). The response to the training request may be displayed in the form of the text on the display (arrow 4 on FIG. 1) and/or reproduced in the form of the voice cue by the voice generation and reproduction subsystem. After that, the automatic activation of the user input subsystem may be performed. After performance of the interaction between the components of the information dialogue system shown by arrow 15 on FIG. 2, the interactions shown by arrows 11-15 of FIG. 2 may be performed again. Furthermore, performance of the interactions shown by arrows 4 and 5 can be optional.

B) Setting, by the User, of Several Options of Responses to the Phrase Selected in the Training Request The user can be given the possibility of setting several options of responses to the phrase selected in the training request by means of cyclic performance of the method for user training of the information dialogue system.

The user may activate the user input subsystem and enter the training request (arrow 1 on FIG. 1). The training request of the user may be received and converted into the text by the user input subsystem. Then, the text obtained as a result of conversion may be sent to the dialogue module. After that, the received text may be processed by the dialogue module and a response to the training request may be formed by the dialogue module (arrow 2 on FIG. 1). Furthermore, a clarification request can be formed and sent to the user before forming of the response (arrow 11 on FIG. 2). For example, the clarification request may have the following content: "Would you like to set the additional response?". Then, the clarification request can be displayed in the form of the text on the display (arrow 12 on FIG. 2), or/and the clarification request can be reproduced in the form of the voice cue by the voice generation and reproduction subsystem (arrow 13 on FIG. 2). After that, the automatic activation of the user input subsystem can be performed. The user may then enter the response to the clarification request or the confirmation request. The response to the clarification request or the confirmation request may be received and converted into the text by the user input subsystem (arrow 14 on FIG. 2). Then, the text of the response to the clarification request or the confirmation request obtained as a result of the conversion may be sent to the dialogue module. After that, the text of the response to the clarification request or the confirmation request may be processed by the dialogue module (arrow 15 on FIG. 2). Thereafter, the response to the training request may be formed by the dialogue module and sent to the user (arrow 3 on FIG. 1). The response to the training request may be displayed in the form of the text on the display (arrow 4 on FIG. 1) and/or reproduced in the form of the voice cue by the voice generation and reproduction subsystem (arrow 5 on FIG. 1). After displaying and reproducing of the response to the training request, the automatic activation of the user input subsystem may be performed.

C) Change/Removal of the Training Request

The user may activate the user input subsystem and enter the training request (arrow 1 on FIG. 1), for example, with the following content "Change settings for question "What is the weather like today?" or "Remove settings for request 'What is the weather like today?'". The training request of the user may be received and converted into the text by the user input subsystem. After that, the text of the training request obtained as a result of conversion may be sent to the dialogue module. Then, the received text may be processed and a response to the training request may be formed by the dialogue module (arrow 2 on FIG. 1). Before forming of the response to the training request, a confirmation request may be formed by the dialogue module and sent to the user (arrow 11 on FIG. 1). For example, the confirmation request may be as follows: "Are you sure that you want to remove the settings for request 'What is the weather like today?'". Then, the confirmation request may be displayed in the form of the text on the display (arrow 12 on FIG. 2) or/and reproduced in the form of the voice cue by the voice generation and reproduction subsystem (arrow 13 on FIG. 2). After that, the automatic activation of the user input subsystem can be performed. Then, the user may enter the response to the confirmation request. The response to the confirmation request may be received and converted into the text by the user input subsystem (arrow 14 on FIG. 2). The response to the confirmation request may be as follows: "Yes, I confirm". Then, the text of the response to the confirmation request obtained as a result of the conversion may be sent to the dialogue module, followed by processing of the text of the response to the confirmation request by the dialogue module (arrow 15 on FIG. 2). After that, the dialogue module may form the response to the training request "Remove settings for 'What is the weather like today?'" and send the response to the user (arrow 3 on FIG. 1) in the form of an action of change/removal of the settings.

D) Setting, by the User, of the Training Request for Establishing a Connection Between a Word/Phrase and an Action/Sequence of Actions It is assumed that the user may need to establish connection between a word or phrase and an action or sequence of actions of the information dialogue system so that after a training request is entered, a certain action or sequence of actions is performed in reply. Thus, there is no longer a requirement to enter long requests, thereby making usage of the information dialogue system convenient and resulting in significant time savings.

The user may activate the user input subsystem and enter the training request (arrow 1 on FIG. 1), for example, with the following content "When I say 'Show weather' open the weather forecast" or "When I say 'Work' check-in at <web site name> and change the status to 'Do not disturb'". Then, the training request of the user may be received and converted into the text by the user input subsystem. After that, the text of the training request obtained as a result of the conversion may be sent to the dialogue module. After that, the received text may be processed and the response to the training request may be formed by the dialogue module (arrow 2 on FIG. 1). Then, the response to the training request is sent to the user in the form of an action, namely saving of the action or sequence of actions associated with a word set by the user for further performing.

E) Setting, by the User, of the Training Request with a Synonym

It is assumed that the user may have the need to establish a connection between some concept and a synonym of the concept for further usage of this synonym during the interaction with the information dialogue system. Thus, there may be no need to pronounce words and phrases which are difficult for recognition, and a high grade of comprehension of the user's requests by the information dialogue system can be provided.

The user may activate the user input subsystem and enter the training request (arrow 1 on FIG. 1), for example, "Set the word <synonym of the concept> as a synonym for the word <concept>". Thereafter, the text of the training request obtained as a result of conversion of the training request may be sent to the dialogue module. The received text may be processed and the response to the training request may be formed by the dialogue module (arrow 2 on FIG. 1). Thereafter, the response to the training request may be sent to the user in the form of an action, namely saving of the word <concept of the synonym> as the synonym for the word <concept>.

Thus, the method for user training of the information dialogue system, which provides for expanding the user interaction with the information dialogue system, provides the possibility to customize the information dialogue system according to preferences of the user, and is convenient in implementation for the user.

Thus, an information dialogue system and a method for user training of the information dialogue system have been described herein. Although embodiments have been described with reference to specific exemplary embodiments, it will be evident that various modifications and changes can be made to these exemplary embodiments without departing from the broader spirit and scope of the present application. Accordingly, the specification and drawings are to be regarded in an illustrative rather than a restrictive sense.

What is claimed is:

1. A method implemented by one or more processors, the method comprising:
   receiving a voice command of a user via a user input subsystem of a computing device;
   converting the voice command into text;
   determining that the text includes a shortcut phrase of a first length and a request to establish a connection of the shortcut phrase with action phrases of a collective second length, wherein the action phrases cause performance, by a dialogue system, of a sequence of dialogue system actions, and wherein the second length is longer than the first length;
   in response to receiving the voice command, establishing a personalized connection of the shortcut phrase with the sequence of dialogue system actions, wherein the personalized connection of the shortcut phrase with the sequence of dialogue system actions is personalized to the user and causes the sequence of dialogue system actions to be performed in reply to the shortcut phrase in interactions by the user with the dialogue system;
   providing, in response to receiving the voice command, a response that causes the client device to present content to the user that indicates the request caused establishing of the personalized connection;
   subsequent to providing the response:
     receiving, via the user input subsystem, an additional voice command provided by the user, and
     converting, by the user input subsystem, the additional voice command into additional text; and
   based on the additional text conforming to the shortcut phrase and based on the personalized connection of the shortcut phrase with the sequence of dialogue system actions:
     sequentially performing, by the information dialogue system, the sequence of dialogue system actions.

2. The method of claim 1, wherein the sequence of dialogue system actions comprises a dialogue system action of accessing a website.

3. The method of claim 1, wherein the sequence of dialogue system actions comprises a dialogue system action of opening a weather forecast.

4. The method of claim 1, further comprising:
   prior to receiving the voice command, activating the input subsystem based on a prior user request.

5. The method of claim 4, wherein activating the input subsystem based on the prior user request is in response to receiving a prior voice command.

6. The method of claim 1, further comprising:
determining that establishing the personalized connection of the shortcut phrase with the sequence of dialogue system actions conflicts with preliminary settings of the information dialogue system;
based on determining that establishing the personalized connection of the shortcut phrase with the sequence of dialogue system actions conflicts with the preliminary settings, modifying the preliminary settings to avoid the conflict.

7. The method of claim 1, further comprising:
receiving a further command via the user input subsystem of the computing device;
converting the further voice command into further text; and
determining that the further text includes a further request to change the personalized connection of the shortcut phrase with the sequence of dialogue system actions.

8. The method of claim 7, further comprising:
in response to receiving the further voice command, replacing the personalized connection with a new personalized connection of a different shortcut phrase with the sequence of dialogue system actions.

9. The method of claim 7, further comprising
in response to receiving the further voice command, replacing the personalized connection with a new personalized connection of the shortcut phrase with a different sequence of dialogue system actions.

10. The method of claim 1, further comprising:
receiving a further command via the user input subsystem of the computing device;
converting the further voice command into further text;
determining that the further text includes a further request to remove the personalized connection of the shortcut phrase with the sequence of dialogue system actions; and
in response to receiving the further command, removing the personalized connection of the shortcut phrase with the sequence of dialogue system actions.

11. The method of claim 1, further comprising, prior to establishing the personalized connection of the shortcut phrase with the sequence of dialogue system actions:
sending a confirmation request to the user, the confirmation request confirming the voice command; and
receiving an affirmative response to the confirmation request, the affirmative response to the confirmation request being provided by the user;
wherein establishing the personalized connection of the shortcut phrase with the sequence of dialogue system actions is in response to receiving the affirmative response to the confirmation request.

12. A system comprising:
at least one processor; and
memory storing instructions that, when executed by the at least one processor cause the system to:
receive a voice command of a user via a user input subsystem of a computing device;
convert the voice command into text;
determine that the text includes a shortcut phrase of a first length and a request to establish a connection of the shortcut phrase with action phrases of a collective second length, wherein the action phrases cause performance, by a dialogue system, of a sequence of dialogue system actions, and wherein the second length is longer than the first length;
in response to receiving the voice command, establish a personalized connection of the shortcut phrase with the sequence of dialogue system actions, wherein the personalized connection of the shortcut phrase with the sequence of dialogue system actions is personalized to the user and causes the sequence of dialogue system actions to be performed in reply to the shortcut phrase in interactions by the user with the dialogue system;
provide, in response to receiving the voice command, a response that causes the client device to present content to the user that indicates the training request caused establishing of the personalized connection;
subsequent to providing the response:
receive, via the user input subsystem, an additional voice command provided by the user, and
convert, by the user input subsystem, the additional voice command into additional text; and
based on the additional text conforming to the shortcut phrase and based on the personalized connection of the shortcut phrase with the sequence of dialogue system actions:
sequentially perform, by the information dialogue system, the sequence of dialogue system actions.

13. The system of claim 12, wherein the instructions, when executed by the at least one processor, further cause the system to:
prior to receiving the voice command, activate the input subsystem based on a prior user request.

14. The system of claim 13, wherein the system is to activate the input subsystem based on the prior user request in response to receiving a prior voice command.

15. The system of claim 12, wherein the instructions, when executed by the at least one processor, further cause the system to:
determine that establishing the personalized connection of the shortcut phrase with the sequence of dialogue system actions conflicts with preliminary settings of the information dialogue system; and
based on determining that establishing the personalized connection of the shortcut phrase with the sequence of dialogue system actions conflicts with the preliminary settings, modify the preliminary settings to avoid the conflict.

16. The system of claim 12, wherein the instructions, when executed by the at least one processor, further cause the system to:
receive a further command via the user input subsystem of the computing device;
convert the further voice command into further text; and
determine that the further text includes a further request to change the personalized connection of the shortcut phrase with the sequence of dialogue system actions.

17. The system of claim 16, wherein the instructions, when executed by the at least one processor, further cause the system to:
in response to receiving the further voice command, replace the personalized connection with a new personalized connection of a different shortcut phrase with the sequence of dialogue system actions.

18. The system of claim 16, wherein the instructions, when executed by the at least one processor, further cause the system too:
in response to receiving the further voice command, replace the personalized connection with a new personalized connection of the shortcut phrase with a different sequence of dialogue system actions.

19. The system of claim 12, wherein the instructions, when executed by the at least one processor, further cause the system to:
   receive a further command via the user input subsystem of the computing device;
   convert the further voice command into further text;
   determine that the further text includes a further request to remove the personalized connection of the shortcut phrase with the sequence of dialogue system actions; and
   in response to receiving the further command, remove the personalized connection of the shortcut phrase with the sequence of dialogue system actions.

20. The system of claim 12, wherein the instructions, when executed by the at least one processor, further cause the system to, prior to establishing the personalized connection of the shortcut phrase with the sequence of dialogue system actions:
   send a confirmation request to the user, the confirmation request confirming the voice command; and
   receive an affirmative response to the confirmation request, the affirmative response to the confirmation request being provided by the user;
      wherein the system is to establish the personalized connection of the shortcut phrase with the sequence of dialogue system actions in response to receiving the affirmative response to the confirmation request.

* * * * *